Dec. 22, 1942.  W. L. ADAMS  2,306,257
FISHING REEL
Filed May 24, 1939  2 Sheets-Sheet 1

INVENTOR
WALTER L. ADAMS

BY

ATTORNEYS

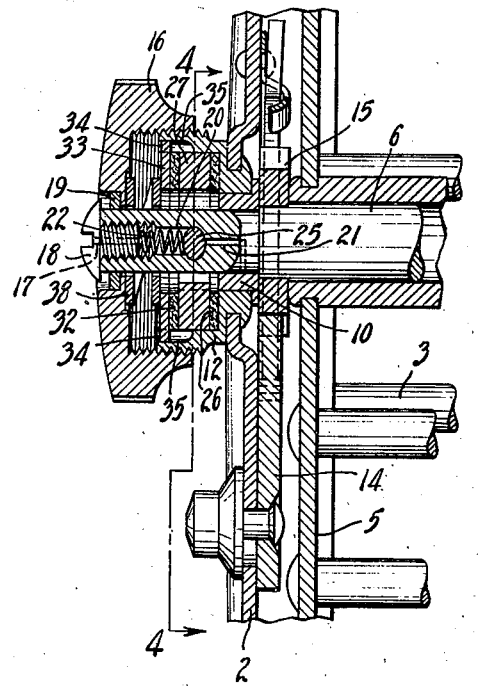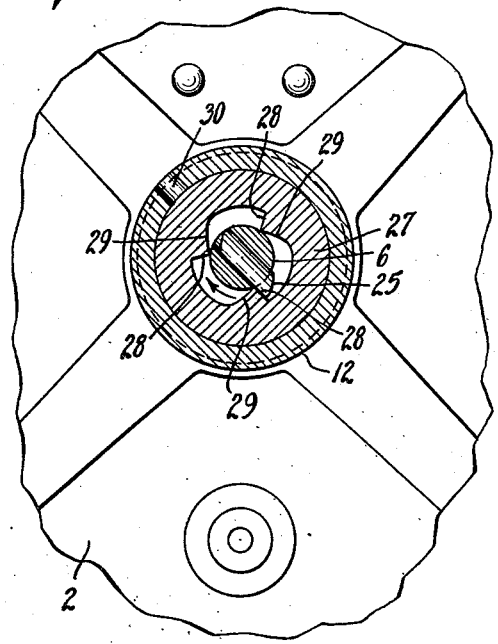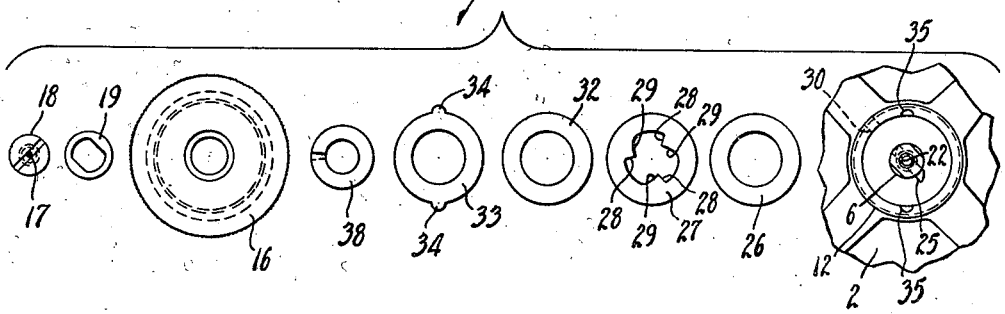

Patented Dec. 22, 1942

2,306,257

UNITED STATES PATENT OFFICE 2,306,257

FISHING REEL

Walter L. Adams, Akron, Ohio, assignor to The Enterprise Manufacturing Company, Akron, Ohio, a corporation of Ohio Application May 24, 1939, Serial No. 275,412

18 Claims. (Cl. 242—84.5)

The present invention relates to fishing reels and particularly to that type of reel which is used primarily for trout or similar game fish, trolling or the like. The ordinary reel of this type is not equipped with any mechanism by which a drag or frictional resistance may be applied upon the unreeling of the line as is occasioned by the running of the fish. The device will also act as an effective anti-backlash device in this or other types of reels.

So far as is known, a reel of the specific type has never been equipped with a satisfactory friction drag which will operate only on the unreeling of the line and which will release instantly on the actuation of the spool to reel in the line. It is also an object of the invention to incorporate in a fishing reel a drag mechanism mounted directly on the shaft to which the spool or both the spool and the operating crank are connected. It is also an object of the invention to combine in a single, compact and unitary structure, a drag mechanism with a clutch operating in one direction only so that the spool will be freed instantaneously from the drag device in reeling in the line. It is also an object to provide an adjustment for the drag mechanism which is located entirely on the exterior of the reel and more desirably on the rear end plate, so that the adjustment can be made while playing the fish and which can be taken apart and reassembled without taking apart or disturbing any other element of the reel structure. This is a considerable advantage over other devices of a like nature, as the drag mechanism can be taken apart for adjusting, oiling and repairs without disassembling any other part of the reel structure. As the drag mechanism requires frequent attention this feature is valuable. It is also possible to remove the drag mechanism entirely, in which case the reel is a fully operative structure, and as the drag mechanism may become inoperative while on a fishing trip, the ability to use the reel without the drag mechanism is a feature of substantial merit.

These and other objects and advantages of the invention will be apparent from the more detailed discussion of the invention as shown and described herein, it being understood that the invention is shown in its best known and preferred form, but that modifications, improvements and changes may be made in specific embodiments without departing from its essential features.

The drawings show one form of the invention in a trout reel:

Fig. 3 is an enlarged cross-section showing the manner in which the drag mechanism is mounted upon the shaft of the reel spool;

Fig. 4 is a section on lines 4—4 of Figs. 2 and 3; and

Fig. 5 is a detail showing several parts of the drag mechanism separated from one another.

Figure 1:
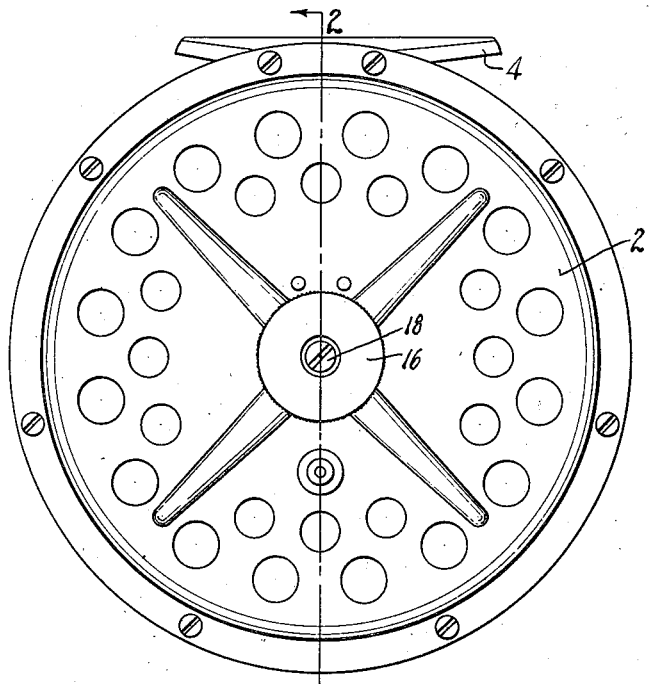
Fig. 1 is a side elevation of the reel.
Figure 2:
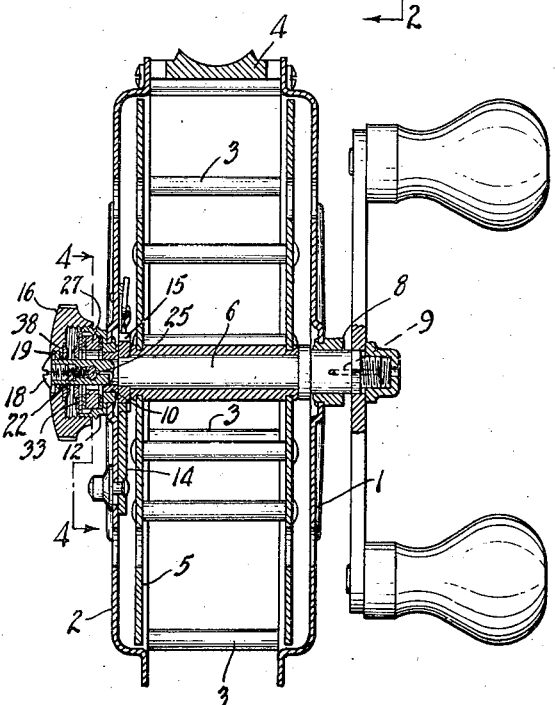
Fig. 2 is a section taken through the shaft of the reel on the line 2—2 of Fig. 1.

The numeral 1 designates the front plate of the reel and the numeral 2 the back plate, which plates are held together to form the frame by a series of pillars 3 and reel plate 4 to form a reel body. The spool is indicated at 5, being permanently attached to the main shaft 6 mounted in a front bearing 8 in the front plate and in a bushing 10 carried in a larger cup-shaped housing 12 mounted in the rear plate 2. An oil passage 9 in the front end of the shaft provides for lubrication of the bearing 8. A releasable click mechanism is shown at 14, engaging the usual ratchet 15 on the spool shaft.

The shaft 6 is extended outwardly beyond the housing 12, being spaced from the inner wall of the housing to provide a chamber in which the drag mechanism is located.

The outer surface of the housing is screw-threaded to receive the cap 16 by which the effective pressure on the drag is adjusted by rotating the cap upon the housing. The outer end of the shaft is interiorly screw-threaded to receive the screw 18 by which the cap is held in position, a washer 19 being located in a recess in the outer face of the cap and beneath the head of the screw. The hole in this washer is flattened, as shown in Fig. 5, and received over the end of the shaft so as to prevent the screw from turning when the cap is rotated. A passage 17 in the screw 18 admits oil to pin 25 and a second passage 21 from the underside of the pin to the shaft bearing permits lubrication of the clutch, drag mechanism and bearings.

The shaft is provided with a bore 20 opening from the base of the screw-threaded portion in which is received a light coil spring 22 which bears upon a reciprocable coupling pin 25 mounted in the shaft and designed to couple the drag mechanism to the shaft when the spool rotates in the unreeling direction, but to free the spool when rotated to reel in the line, as will be explained in detail. It will be noted that the screw 18 exerts the requisite tension on the spring so that the latter will retard the pin in its movement sufficiently so the pin will not move too freely.

Located in contact with the bottom of the cup 12 is a friction washer 26, usually made of a fibre friction stock, and adjacent this is the cage-like member or ring 27 which, with the pin 25, forms the coupling or one-way clutch by which the spool shaft is connected to the drag. The inner surface of the cage is formed with a series of ratchet teeth, as shown in Figs. 4 and 5, having inclined surfaces 29, usually three in number, leading to the abrupt locking surfaces 28 which are radially arranged. It will be observed that the pin 25 is cut away on an arc on the two surfaces which ride over the inclined surfaces of the cage when the spool is rotated in the counter-clockwise direction as shown in Fig. 4, which is in the direction of reeling in the line. The opposite side of the pin 25 is straight so that when the spool is rotated in the clockwise direction shown by the arrow in Fig. 4, the surfaces of the pin will rest against the radial surfaces on the ring and the shaft and the ring will be locked together, and this occurs in the outward running of the line when the drag mechanism is to be effective. The pin is usually made of hardened steel and is of the proper length so that as the line is reeled in, it will shuttle back and forth, but too free movement is retarded by the spring 22. Attention is directed to the hole 30 in the outer wall of the cup 12 which is provided so that the pin can be inserted, or removed, through this hole when the cage is out of the housing.

On the outer side of the ring is the second fibre disk 32 and placed over this is the metal disk 33 which is provided with lugs or keys 34 which are received in grooves 35 on the inner wall of the cup 12, as shown in Fig. 5, so that the disk 33 is locked to the housing but will move axially of the assembly when pressure is applied in the adjustment of the drag.

Above the keyed disk 33 is a flattened coiled spring 38 which bears against the disk and the underside of the cap to exert the requisite tension on the members of the drag. As the cap is screwed up or down on the housing, the pressure is lessened or increased to make the drag adjustable. The range of movement is such that when the cap is in its outermost position, no substantial drag is applied to the spool and the line may be unreeled freely as in running out the bait, but when enough of the line has been run out, the cap is tightened and the desired drag exerted.

It will be seen that the rotation of the spool is retarded in unreeling the line by the friction exerted between the ring, which is then locked to the shaft, and the fixed housing 12, the inside plane surface of which may be considered as a fixed disk, and the feathered disk 33, but when the line is to be reeled in, the shaft is freed of the ring automatically and is thus free to rotate.

As the housing opens outwardly of the reel structure, the entire drag mechanism is accessible by the removal of the closure 16 and can be taken out of the reel for inspection, oiling and repair or replacement of parts without disturbing or removing any other part of the reel.

It will also be noted that the frictional drag is exerted between the faces of the ring 27 and the opposing faces of the housing and the disk 33 keyed thereto, so that the maximum surface contact is provided, making for smoother and more efficient retarding action in the drag mechanism.

Not only does the device operate as an effective drag, but it is an efficient backlash and, as such, may be incorporated in other types of reels. It prevents jerky operation of the spool as is oftentimes experienced in reeling in a fish. Therefore, the device makes a much more efficient reel than the usual reel which is not equipped with means to prevent or retard reverse movement of the spool.

The invention may be incorporated in other types of reels and its advantages in those reels will be apparent.

What is claimed is:

1. In a fishing reel, a reel body, a spool and a spool shaft, a housing mounted on the exterior of the reel body, an extension on the shaft in the housing, a drag mechanism in the housing, a coupling between the shaft and the drag mechanism operative in one direction of spool rotation only, and a removable closure on the outer end of the housing to permit removal of the drag mechanism.

2. In a fishing reel, a reel body, a spool and a spool shaft, a housing mounted on the exterior of the reel body, an extension on the shaft in the housing, a friction drag device associated with the housing, means to adjust the friction of the drag, and a coupling between the shaft and the drag operative in one direction only, the friction drag device being removable from the housing without disturbing any other part of the reel.

3. In a fishing reel, a reel body, a spool and a spool shaft, a fixed housing on the exterior of the reel body into which the shaft is extended, a disk keyed to the housing, a ring in the housing, means to lock the ring and the shaft together in one direction only, friction elements between the ring and the housing and disk, and a removable closure on the housing to exert adjustable pressure on the elements within the housing.

4. In a fishing reel, a reel frame, a spool, a spool shaft mounted in the frame, a housing located on the exterior of the frame surrounding one end of the shaft, a ring rotatable in the housing, friction elements in the housing to retard the rotation of the ring, a clutch operative automatically to lock the shaft and the ring in one direction but to release the shaft and the ring in the opposite direction, and a removable closure for the housing permitting the friction elements to be removed therefrom without disturbing any other element of the reel.

5. In a fishing reel having an end plate, a spool, a spool shaft, a bearing in the end plate for the spool shaft, a housing on the exterior of the end plate into which the shaft is extended, and means in the housing to exert varying degrees of resistance to the rotation of the spool comprising a ring member located in the housing and rotatable with the shaft in one direction only, and an adjustable cap on the housing adapted to press the ring member toward the base of the housing.

6. In a fishing reel having an end plate, a spool, a spool shaft, a bearing in the end plate for the spool shaft, a housing on the exterior of the end plate into which the shaft is extended, and means in the housing to exert varying degrees of resistance to the rotation of the spool comprising a ring member located in the housing and rotatable with the shaft in one direction only, an adjustable cap on the housing adapted to press the ring member toward the base of the housing, and a spring between the cap and the ring member.

7. In a fishing reel having an end plate, a spool, a spool shaft, a bearing in the end plate for the spool shaft, a housing on the exterior of the end plate into which the shaft is extended, and means in the housing to exert varying degrees of resistance to the rotation of the spool comprising a ring member located in the housing and rotatable with the shaft in one direction only, an adjustable cap on the housing adapted to press the ring member toward the base of the housing, and a disk movable axially of the housing but non-rotatable with respect thereto and movable by the cap toward the end plate.

8. In a fishing reel having an end plate, a spool, a spool shaft, a bearing in the end plate for the spool shaft, a housing on the exterior of the end plate into which the shaft is extended, and means in the housing to exert varying degrees of resistance to the rotation of the spool comprising a ring member located in the housing and rotatable with the shaft in one direction only, an adjustable cap on the housing adapted to press the ring member toward the base of the housing, a disk movable axially of the housing but non-rotatable with respect thereto and movable by the cap toward the end plate, and a spring pressure member between the cap and the disk.

9. In a fishing reel, an end plate, a spool and a spool shaft, the shaft extending through the end plate, a housing on the exterior of the end plate and surrounding but spaced from the extended end of the shaft, a removable cover on the housing, a ring shaped frictional element located in the housing and surrounding the shaft, and means to connect said frictional element to the shaft in one direction of rotation only.

10. In a fishing reel, an end plate, a housing on the exterior of the end plate, a spool, a shaft upon which the spool is mounted, the shaft extending through the end plate and into the housing, a plurality of ring shaped frictional elements located in the housing and fitting loosely over the shaft, a removable cover for the housing to retain the frictional elements in position, and means operative in one direction of rotation only to connect the shaft with one of said frictional elements.

11. In a fishing reel, a reel body, a spool, a shaft operatively connected to the spool, a housing mounted on the exterior of the reel body, the shaft extending into the housing, a plurality of friction drag members in the housing, means to connect the shaft in one direction of rotation only with one of the friction drag members, and a closure on the outer end of the housing, said closure being removable without disturbing any other part of the reel to permit access to the interior of the housing.

12. In a fishing reel, a reel body, a spool, a shaft operatively connected to the spool, a housing mounted on the exterior of the reel body, the shaft extending into the housing, a plurality of friction drag members in the housing, means to connect the shaft in one direction of rotation only with one of the friction drag members, a closure in screw-threaded engagement with the outer end of the housing, and means to transmit pressure exerted by the closure to the drag members, said closure being removable without disturbing any other part of the reel and to permit access to the interior of the housing.

13. In a fishing reel, a reel body, a spool and a spool shaft, a fixed housing on the exterior of the reel body, a plurality of superposed disks constituting friction drag elements located within the housing, one of said disks having a non-rotative but axially slidable connection with the housing, and means to connect the spool shaft and a second disk for unitary rotation in one direction but to release the shaft for free rotation in the other direction.

14. In a fishing reel, a reel body, a spool and a spool shaft, a fixed housing on the exterior of the reel body, a plurality of superposed disks constituting friction drag elements located within the housing, means operative along the axis of the spool shaft to vary the frictional resistance between the disks, one of said disks having a non-rotative but axially slidable connection with the housing, and means to connect the spool shaft and a second disk for unitary rotation in one direction but to release the shaft for free rotation in the other direction.

15. In a fishing reel, a reel body, a spool and a spool shaft, means to retard the rotation of the spool in one direction only comprising a plurality of superposed friction elements, one of said elements being a disk fixed to the reel body, a second element being a disk keyed to the reel body and a third ring-shaped element lying between the first and second disks, and a clutch within the ring shaped element and engageable with the interior periphery thereof and operative to lock the shaft and the ring-shaped element together in one direction of rotation only.

16. In a fishing reel, a reel body, a spool and a spool shaft, means to retard the rotation of the spool in one direction only comprising a plurality of superposed friction elements, one of said elements being a disk fixed to the reel body, a second element being a disk keyed to the reel body and a third ring-shaped element lying between the first and second disks, means to compact the friction elements together with variable degrees of pressure, and a clutch within the ring shaped element and engageable with the interior periphery thereof and operative to lock the shaft and the ring-shaped element together in one direction of rotation only.

17. In a fishing reel, an anti-backlash device comprising a frame, a spool rotatable in the frame, a spool shaft which is extended beyond the frame, a housing on the frame and surrounding the extended end of the shaft, friction retarding means for the spool shaft located in the housing, said friction retarding means including at least two superposed disks one of which is non-rotatively connected with the housing, and means to lock another of said disks and the spool shaft for unitary rotation in one direction only.

18. In a fishing reel, an anti-backlash device comprising a frame, a spool rotatable in the frame, a spool shaft which is extended beyond the frame, a housing on the frame and surrounding the extended end of the shaft, friction retarding means for the spool shaft located in the housing, said friction retarding means including at least two superposed disks one of which is non-rotatively connected with the housing, means to lock another of said disks and the spool shaft for unitary rotation in one direction only, and means to exert variable pressures on the superposed disks.

WALTER L. ADAMS.